US012242714B2

(12) United States Patent
Huang et al.

(10) Patent No.: US 12,242,714 B2
(45) Date of Patent: Mar. 4, 2025

(54) ICON ARRANGEMENT METHOD, USER TERMINAL AND STORAGE MEDIUM

(71) Applicant: GREE ELECTRIC APPLIANCES, INC. OF ZHUHAI, Zhuhai (CN)

(72) Inventors: Jinwu Huang, Zhuhai (CN); Lu Zhang, Zhuhai (CN); Guoren Bian, Zhuhai (CN); Yingjiang Ma, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 11 days.

(21) Appl. No.: 18/145,356

(22) Filed: Dec. 22, 2022

(65) Prior Publication Data

US 2023/0128155 A1   Apr. 27, 2023

Related U.S. Application Data

(63) Continuation of application No. PCT/CN2020/140037, filed on Dec. 28, 2020.

(30) Foreign Application Priority Data

Sep. 18, 2020 (CN) .......................... 202010992583.6

(51) Int. Cl.
G06F 3/0482 (2013.01)
G06F 3/04817 (2022.01)
G06F 3/04845 (2022.01)

(52) U.S. Cl.
CPC ...... *G06F 3/04845* (2013.01); *G06F 3/04817* (2013.01); *G06F 3/0482* (2013.01)

(58) Field of Classification Search
CPC .................................................. G06F 3/04845
See application file for complete search history.

(56) References Cited

U.S. PATENT DOCUMENTS 8,668,591 B2 * 3/2014 Evans .................... G06F 21/31
463/43
11,121,935 B2 * 9/2021 Powar .................... G07F 9/001
(Continued)

FOREIGN PATENT DOCUMENTS

CN       1786906 A    6/2006
CN     104169854 A   11/2014
(Continued)

OTHER PUBLICATIONS

First Office Action issued in counterpart Chinese Patent Application No. 202010992583.6, dated Aug. 16, 2021.
(Continued)

*Primary Examiner* — Tuyetlien T Tran
(74) *Attorney, Agent, or Firm* — Westbridge IP LLC (57) ABSTRACT

Disclosed are an icon arrangement method, an icon arrangement apparatus, a user terminal, and a storage medium. The method includes: determining a target interface; determining at least one first icon in the target interface and an arrangement position of each first icon in the target interface; determining, from a plurality of second icons on the user terminal, a target icon matching the first icon; determining a target position, corresponding to the target icon, in an interface of the user terminal based on the arrangement position corresponding to the first icon that matches the target icon; and arranging the target icon in the interface of the user terminal based on the target position. In this way, automatic arrangement of icons in the interface of the user terminal can be achieved, thereby improving user experience.

13 Claims, 4 Drawing Sheets

(56) References Cited

U.S. PATENT DOCUMENTS

| | | | |
|---|---|---|---|
| 11,138,440 B1* | 10/2021 | Wang | G06V 20/48 |
| 2013/0055124 A1* | 2/2013 | Wang | G06F 9/451 |
| | | | 715/765 |
| 2013/0125009 A1* | 5/2013 | DeLuca | G06F 16/958 |
| | | | 715/740 |
| 2013/0268894 A1* | 10/2013 | Jeon | G06F 40/143 |
| | | | 715/835 |
| 2013/0297677 A1* | 11/2013 | Wan | G06F 9/452 |
| | | | 709/203 |
| 2014/0013254 A1* | 1/2014 | Hosein | G06F 3/04883 |
| | | | 715/765 |
| 2014/0203999 A1* | 7/2014 | Shim | G06F 9/451 |
| | | | 345/2.2 |
| 2014/0282063 A1* | 9/2014 | Hui | G06F 3/04817 |
| | | | 715/746 |
| 2015/0113457 A1* | 4/2015 | Li | G06F 3/0488 |
| | | | 715/765 |
| 2015/0277671 A1* | 10/2015 | Nagata | G06F 3/04817 |
| | | | 715/811 |
| 2015/0355816 A1* | 12/2015 | Shim | G06F 3/1454 |
| | | | 715/745 |
| 2016/0349963 A1 | 12/2016 | Xiangli et al. | |
| 2017/0235436 A1* | 8/2017 | Hooton | G06F 3/04817 |
| | | | 705/7.11 |
| 2018/0070389 A1* | 3/2018 | Morgan | H04W 76/10 |
| 2020/0034023 A1* | 1/2020 | Sakaino | G06F 3/04817 |
| 2020/0042148 A1 | 2/2020 | Huang | |
| 2021/0286510 A1* | 9/2021 | Tyler | G06F 3/0486 |
| 2022/0083203 A1* | 3/2022 | Zhi | G06F 3/0486 |
| 2022/0164091 A1* | 5/2022 | Kang | G06F 3/1423 |

FOREIGN PATENT DOCUMENTS

| | | |
|---|---|---|
| CN | 105511789 A | 4/2016 |
| CN | 106201196 A | 12/2016 |
| CN | 106897069 A | 6/2017 |
| CN | 107526642 A | 12/2017 |
| CN | 108804183 A | 11/2018 |
| JP | 2016508631 A | 3/2016 |

OTHER PUBLICATIONS

International Search Report issued in corresponding PCT Application No. PCT/CN2020/140037, dated Jun. 23, 2021.

Notification to Grant Patent Right for Invention issued in counterpart Chinese Patent Application No. 202010992583.6, dated Oct. 22, 2021.

Notice of Reasons for Refusal issued in counterpart Japanese Patent Application No. JP 2022-578864, dated Feb. 6, 2024.

* cited by examiner

ICON ARRANGEMENT METHOD, USER TERMINAL AND STORAGE MEDIUM

CROSS-REFERENCE TO RELATED APPLICATIONS

The present disclosure is a continuation of International Application No. PCT/CN2020/140037, filed on Dec. 28, 2020, which claims priority to Chinese Patent Application No. 202010992583.6, filed on Sep. 18, 2020 and entitled "ICON ARRANGEMENT METHOD, APPARATUS, USER TERMINAL AND STORAGE MEDIUM", the entire contents of which are hereby incorporated by reference.

TECHNICAL FIELD

Embodiments of the present disclosure relates to the field of terminal technologies, and in particular, to an icon arrangement method, an icon arrangement apparatus, a user terminal and a storage medium.

BACKGROUND

With the development of computer technologies, a growing quantity of applications are installed on a user terminal. In order to enable users to use the applications conveniently, it becomes especially important to appropriately arrange application icons (briefly referred to as icons below) in an interface of a user terminal.

However, for older persons, there are still many inconveniences during using of a user terminal such as a smartphone. For example, older persons cannot arrange icons in an interface of the smartphone, and as a result, it is likely that they fail to quickly and conveniently tap a required icon in the interface of the smartphone, which greatly affects use experience of older persons in using the user terminal.

SUMMARY

In view of this, embodiments of the present disclosure provide an icon arrangement method, an icon arrangement apparatus, a user terminal, and a storage medium, to resolve a problem in related technologies that icons in an interface of a user terminal cannot be automatically arranged.

According to a first aspect, an embodiment of the present disclosure provides an icon arrangement method, applied to a user terminal. The method includes:
  determining a target interface;
  determining at least one first icon in the target interface and determining an arrangement position of each first icon in the target interface;
  determining, from a plurality of second icons on the user terminal, a target icon matching the first icon;
  determining a target position, corresponding to the target icon, in an interface of the user terminal based on the arrangement position corresponding to the first icon that matches the target icon; and
  arranging the target icon in the interface of the user terminal based on the target position.

In a possible implementation, the determining a target interface includes:
  determining a received interface as the target interface; or
  determining the target interface from a local photo gallery.

In a possible implementation, the determining an arrangement position of each first icon in the target interface includes:
  determining an icon layout position of each first icon in the target interface or coordinate information of a center of each first icon in the target interface; and
  determining the icon layout position or the coordinate information as the arrangement position of the first icon in the target interface.

In a possible implementation, the determining, from a plurality of second icons on the user terminal, a target icon matching the first icon includes:
  for each first icon, determining a degree of similarity between the first icon and each of the plurality of second icons on the user terminal; and
  determining a second icon with a highest degree of similarity as the target icon matching the first icon.

In a possible implementation, the arranging the target icon in the interface of the user terminal based on the target position includes:
  for each target icon, determining whether the target position corresponding to the target icon overflows the interface of the user terminal; and
  if the target position corresponding to the target icon does not overflow the interface of the user terminal, arranging the target icon at the target position in the interface of the user terminal.

In a possible implementation, the method further includes:
  if the target position corresponding to the target icon overflows the interface of the user terminal, determining whether an idle position is available in the interface of the user terminal;
  if an idle position is available in the interface of the user terminal, arranging the target icon at the idle position in the interface of the user terminal;
  if no idle position is available in the interface of the user terminal, putting the target icon and another target icon already arranged in the interface of the user terminal into a same folder, and arranging the folder at a target position, corresponding to the another target icon, in the interface of the user terminal.

In a possible implementation, the arranging the target icon at the idle position in the interface of the user terminal includes:
  if a plurality of idle positions are available in the interface of the user terminal, selecting, from the plurality of idle positions, an idle position closest to the target position corresponding to the target icon; and
  arranging the target icon at the selected idle position in the interface of the user terminal.

According to a second aspect, an embodiment of the present disclosure provides an icon arrangement apparatus, applied to a user terminal. The apparatus includes:
  a first determining module, configured to determine a target interface;
  a second determining module, configured to determine at least one first icon in the target interface and an arrangement position of each first icon in the target interface;
  a third determining module, configured to determine, from a plurality of second icons on the user terminal, a target icon matching the first icon;
  a fourth determining module, configured to determine a target position, corresponding to the target icon, in an interface of the user terminal based on the arrangement position corresponding to the first icon that matches the target icon; and an icon arrangement module, configured to arrange the target icon in the interface of the user terminal based on the target position.

In a possible implementation, the first determining module is specifically configured to:

determine a received interface as the target interface; or determine the target interface from a local photo gallery.

In a possible implementation, the second determining module is specifically configured to:

determine an icon layout position of each first icon in the target interface or coordinate information of a center of each first icon in the target interface; and determine the icon layout position or the coordinate information as the arrangement position of the first icon in the target interface.

In a possible implementation, the third determining module is specifically configured to:

for each first icon, determine a degree of similarity between the first icon and each of the plurality of second icons on the user terminal; and determine a second icon with a highest degree of similarity as the target icon matching the first icon.

In a possible implementation, the icon arrangement module is specifically configured to:

for each target icon, determine whether the target position corresponding to the target icon overflows the interface of the user terminal; and if the target position corresponding to the target icon does not overflow the interface of the user terminal, arrange the target icon at the target position in the interface of the user terminal.

In a possible implementation, the icon arrangement module is further configured to:

if the target position corresponding to the target icon overflows the interface of the user terminal, determine whether an idle position is available in the interface of the user terminal;

if an idle position is available in the interface of the user terminal, arrange the target icon at the idle position in the interface of the user terminal;

if no idle position is available in the interface of the user terminal, put the target icon and another target icon already arranged in the interface of the user terminal into a same folder, and arrange the folder at a target position, corresponding to the another target icon, in the interface of the user terminal.

In a possible implementation, the icon arrangement module is specifically configured to:

if a plurality of idle positions are available in the interface of the user terminal, select, from the plurality of idle positions, an idle position closest to the target position corresponding to the target icon; and arrange the target icon at the selected idle position in the interface of the user terminal.

According to a third aspect, an embodiment of the present disclosure provides a user terminal, including a processor and a memory. The processor is configured to execute an icon arrangement program stored in the memory, to implement the icon arrangement method according to any implementation of the first aspect.

According to a fourth aspect, an embodiment of the present disclosure provides a storage medium. The storage medium stores one or more programs, and the one or more programs are executed by one or more processors, to implement the icon arrangement method according to any implementation of the first aspect.

In the technical solutions provided in the embodiments of the present disclosure, a target interface is determined, and at least one first icon in the target interface and an arrangement position of each first icon in the target interface are determined; a target icon matching the first icon is determined from a plurality of second icons on a user terminal; a target position corresponding to the target icon, in an interface of the user terminal is determined based on an arrangement position corresponding to the first icon that matches the target icon; and the target icon is arranged in the interface of the user terminal based on the target position. In this way, automatic arrangement of icons in the interface of the user terminal may be achieved, thereby improving user experience.

DETAILED DESCRIPTION OF THE EMBODIMENTS

To make objectives, technical solutions, and advantages of embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

For ease of understanding the embodiments of the present disclosure, the following first describes, with reference to the accompanying drawings, an application scenario of an icon arrangement method provided in the present disclosure as examples.

Figure 1:
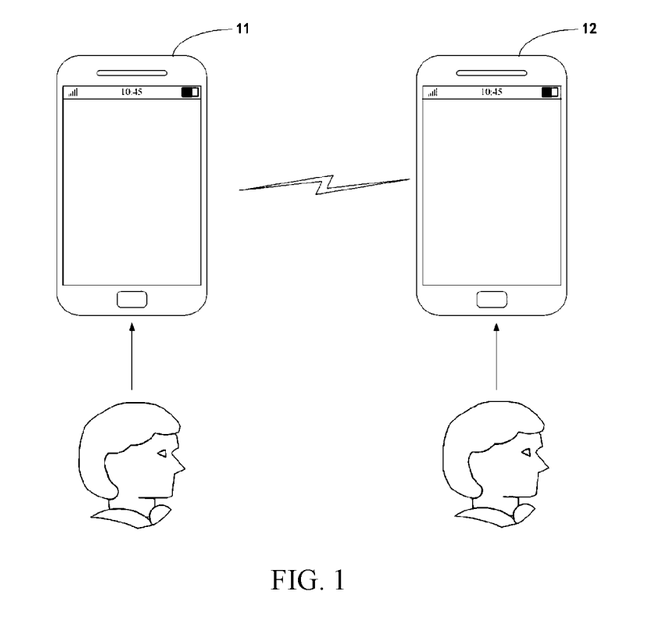
FIG. 1 is a schematic diagram of an example application scenario according to the present disclosure.

FIG. 1 is a schematic diagram of an example application scenario according to the present disclosure. As shown in FIG. 1, a user terminal 11 and a user terminal 12 are included. The user terminal 11 and the user terminal 12 are communicatively connected, and the user terminal may be a plurality of types of electronic devices having a display, including but not limited to: a smartphone, a tablet computer, a laptop computer, a desktop computer, and the like. In FIG. 1, the smartphone are merely used as examples.

In an example application scenario, it is assumed that a user corresponding to the user terminal 11 is an older person, and the older person still has many inconveniences when using a smartphone. For example, there are too many applications installed on the smartphone, and the older person cannot arrange a plurality of icons in an interface of the smartphone according to his/her usage needs and usage habits, and as a result, it is likely that the user fail to quickly and conveniently tap a required icon in the interface of the smartphone.

In this application scenario, the icon arrangement method provided in the present disclosure can be applied, to achieve automatic arrangement of icons in the interface of the user terminal according to a requirement of a user.

The following explains and describes the icon arrangement method provided in the present disclosure further with reference to the accompanying drawings by using specific embodiments, and the embodiments do not constitute a limitation on the embodiments of the present disclosure.

Figure 2:
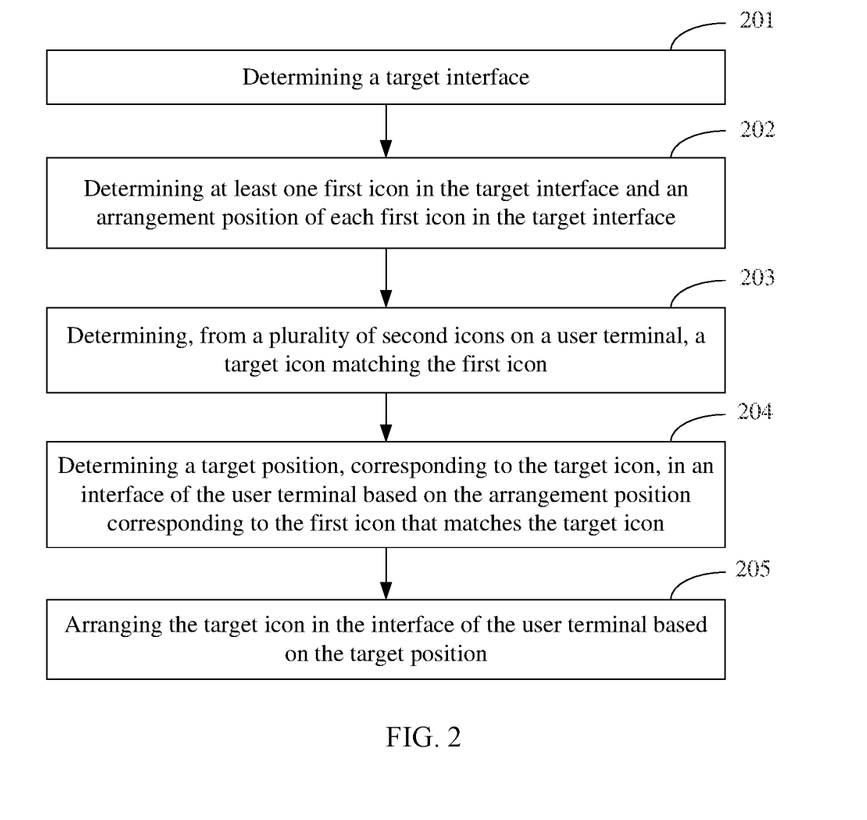
FIG. 2 is a flowchart of an icon arrangement method according to an example embodiment of the present disclosure.

FIG. 2 is a flowchart of an icon arrangement method according to an example embodiment of the present disclosure. The method may be applied to a user terminal. In an example, the user terminal is the user terminal 11 shown in FIG. 1. As shown in FIG. 2, the method includes the following steps.

Step 201: Determining a target interface.

In an embodiment, taking the application scenario shown in FIG. 1 as an example, a user corresponding to the user terminal 11 (referred to as user A below) may notify a requirement of user A to a user corresponding to the user terminal 12 (referred to as user B below), and user B may arrange icons on the user terminal 12 according to the requirement of user A. Further, the user terminal 12 sends an interface with already arranged icons to the user terminal 11, and the user terminal 11 may determine the received interface as a target interface, and then automatically arrange icons in a local interface based on the target interface.

Figure 3:
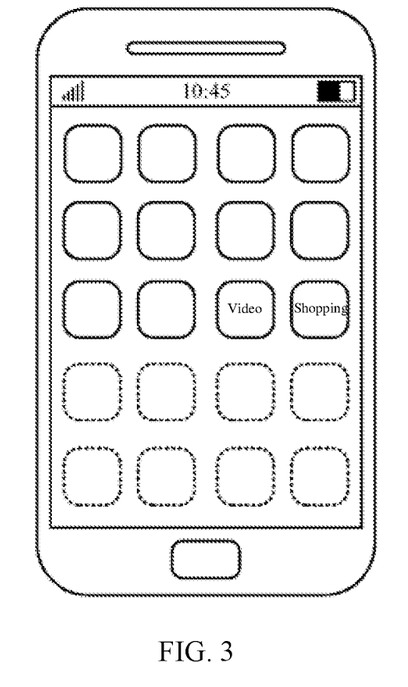
FIG. 3 is a schematic diagram of an arrangement of icons in an interface of a user terminal 12.

For example, it is assumed that commonly used applications of user A include a video application and a shopping application, and user A is accustomed to holding a lower end of a mobile phone with a right hand to perform operations. In this case, it can be understood that arranging icons of the video application and the shopping application at a position close to a lower-right corner of a screen of the mobile phone is more convenient for the user A to click. Based on this, in the interface of the user terminal 12, user B may arrange the icons of the video application and the shopping application at a position close to the lower-right corner of the screen of the mobile phone. For example, FIG. 3 is a schematic diagram of an arrangement of icons in the interface of the user terminal 12. Certainly, the video application and the shopping application are pre-installed on the user terminal 12.

Further, user B may operate the user terminal 12 to take a screenshot of the interface with already arranged icons, and send the screenshot, namely, the interface of the user terminal 12, to the user terminal 11 via an instant messaging tool. In this way, the user terminal 11 may receive an interface of another user terminal, and determine the received interface as the target interface. The foregoing instant messaging tool includes but is not limited to: QQ, WeChat, a short message service, DingTalk, and the like.

In another embodiment, on a basis of the foregoing embodiment, after receiving the interface of another user terminal, the user terminal 11 may further save it in a local photo gallery. In this way, when needing to arrange icons the next time, the user terminal 11 may determine the target interface from the local photo gallery based on a user operation.

It should be noted that a source of the interface in the local photo gallery described in the foregoing embodiment is merely an example. In practice, the user terminal 11 may alternatively obtain the interface with already arranged icons in another manner and save it in the local photo gallery. For example, the user terminal 11 may download an interface from the internet based on a user operation and save it in the local photo gallery, and the present disclosure is not limited thereto.

Step 202: Determining at least one first icon in the target interface and determining an arrangement position of each first icon in the target interface.

It should be first noted that, in embodiments of the present disclosure, for ease of description, an icon in the target interface is referred to as the first icon. During application, there may be one or more first icons in the target interface.

In an embodiment, the at least one first icon in the target interface and the arrangement position of each first icon in the target interface may be determined by using a machine learning technology. Specifically, a machine learning model (referred to as an icon recognition model below) capable of recognizing an icon in an input picture and determining an arrangement position of the icon in the input picture may be pre-trained. Based on this, the target interface may be input into the icon recognition model, so that the icon recognition model recognizes the first icon in the target interface, and when the first icon is recognized, further detects an arrangement position of the first icon in the target interface. In this way, the at least one first icon in the target interface and the arrangement position of each first icon in the target interface may be determined.

In an example, the arrangement position is represented by coordinate information of a center of the first icon in the target interface. In other words, the determining an arrangement position of each first icon in the target interface includes: determining coordinate information of a center of each first icon in the target interface, and determining the coordinate information as the arrangement position of the first icon in the target interface.

In this example, a coordinate system is usually established with an upper-left corner vertex of the target interface used as an origin, a horizontally rightward direction used as a positive direction of X axis, and a vertically downward direction used as a positive direction of Y axis, and then the coordinate information of the center of each first icon in the coordinate system is determined.

In another example, the arrangement position is represented by an icon layout position of the first icon in the target interface. In other words, the determining an arrangement position of each first icon in the target interface includes: determining an icon layout position of each first icon in the target interface, and determining the icon layout position as the arrangement position of the first icon in the target interface.

In this example, the icon layout position of the first icon in the target interface is usually represented by a row and a column of the first icon. For example, an icon layout shown in FIG. 3 is a 5*4 (five rows and four columns) layout, where an icon layout position of an icon of the video application is the third row and the third column, and an icon layout position of an icon of the shopping application is the third row and the fourth column.

Step 203: Determining, from a plurality of second icons on the user terminal, a target icon matching the first icon.

It should be first noted that, in embodiments of the present disclosure, for ease of description, a plurality of icons on a user terminal such as the user terminal 11 are referred to as the second icons. During application, a plurality of applications may be installed on the user terminal, and icons of the plurality of applications may be arranged in one interface or distributed in a plurality of interfaces. Therefore, the plurality of second icons on the user terminal are second icons of all applications installed on the user terminal instead of second icons in a specific single interface of the user terminal.

Further, during application, each second icon on the user terminal may not necessarily exists in the target interface. Therefore, in step 203, an icon (referred to as the target icon) matching the first icon is determined from the plurality of second icons on the user terminal. The matching mentioned herein means that the second icon and the first icon are icons of a same application. It can be understood that, during application, screen sizes of different user terminals may be different, and even if the screen sizes are the same, users' usage habits may also be different, for example, some users prefer large icons while other users prefer small icons. Therefore, sizes of the first icon and the second icon that match each other may be different. Therefore, when the user terminal determines, from the plurality of second icons on the user terminal, the target icon matching the first icon, the icon size may be ignored.

In an embodiment, the target icon matching the first icon may be determined from the plurality of second icons on the user terminal in the following manner: for each first icon determined in step 202, determining a degree of similarity between the first icon and each of the plurality of second icons on the user terminal; and determining the second icon with a highest degree of similarity as the target icon matching the first icon.

Step 204: Determining a target position, corresponding to the target icon, in an interface of the user terminal based on the arrangement position corresponding to the first icon that matches the target icon.

In step 204, the arrangement position corresponding to the first icon matching the target icon may be determined as a corresponding position (referred to as the target position below) of the target icon in the interface of the user terminal.

Step 205: Arranging the target icon in the interface of the user terminal based on the target position.

During application, sizes of the target interface and the interface of the user terminal may not be necessarily the same, and icon layouts may also not be necessarily the same. For example, the target interface adopts a 5*4 icon layout, while the interface of the user terminal adopts a 4*3 icon layout. Based on this, in an embodiment, in step 205, for each target icon, whether the target position corresponding to the target icon overflows the interface of the user terminal may be first determined. If no, the target icon is arranged at the target position in the interface of the user terminal. If yes, it means that the target icon cannot be arranged at the target position.

If the target icon cannot be arranged at the target position, in an optional implementation, whether an idle position is available in the interface of the user terminal is first determined. If yes, the target icon is arranged at the idle position in the interface of the user terminal. If no, the target icon and another target icon already arranged in the interface of the user terminal are put into a same folder, and the folder is arranged at a target position, corresponding to the another target icon, in the interface of the user terminal. It should be noted that the idle position does not include any target position.

In an optional implementation, if a plurality of idle positions are available in the interface of the user terminal, an idle position closest to the target position corresponding to the target icon is selected from the plurality of idle positions; and the target icon is arranged at the selected idle position in the interface of the user terminal.

Figure 4:
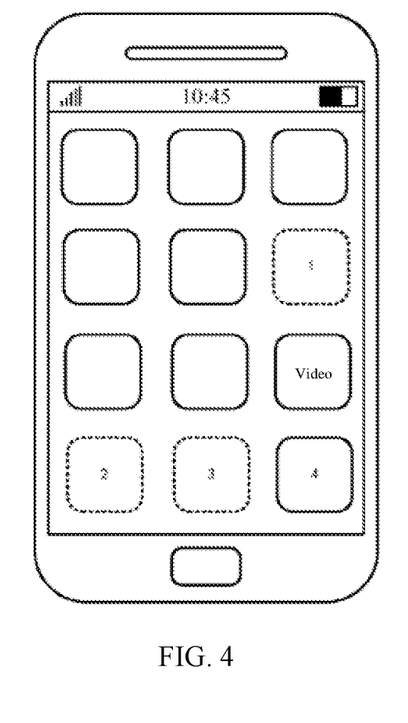
FIG. 4 is a schematic diagram of an arrangement of one icon in an interface of a user terminal 11.

For example, FIG. 4 is a schematic diagram of an arrangement of one icon in an interface of the user terminal 11. With reference to the interface shown in FIG. 3, a target position corresponding to the icon of the shopping application overflows the interface shown in FIG. 4. Based on the foregoing description, an idle position closest to the target position in the third row and the fourth column, namely, an idle position marked with 1, may be selected from three idle positions marked with 1 to 3. The icon of the shopping application may be arranged at the position marked with 1.

Further, if two or more idle positions closest to the target position are available, for example, assuming that a position marked with 4 in FIG. 4 is also idle, either of the idle positions may be randomly selected, or an idle position close to a side (such as a lower position or a right position) of the screen may be selected according to a preset rule.

Figure 5:
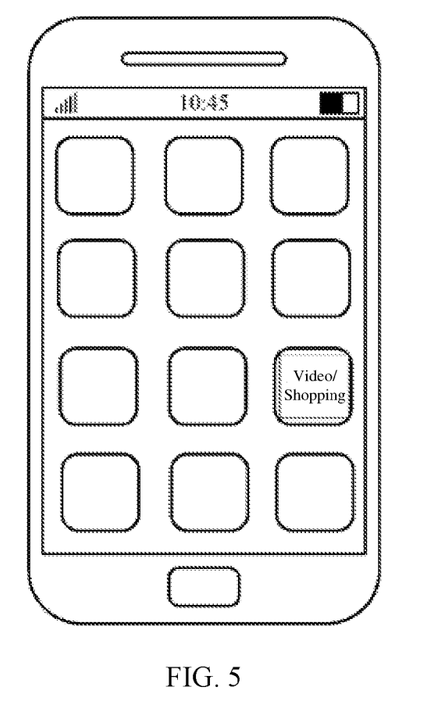
FIG. 5 is a schematic diagram of an arrangement of another icon in an interface of a user terminal 11.

Further, FIG. 5 is a schematic diagram of an arrangement of another icon in an interface of the user terminal 11. No idle position is available in an interface shown in FIG. 5. In this case, based on the foregoing description, another target icon such as the icon of the video application may be selected from the interface shown in FIG. 5, the icon of the shopping application and the target icon of the video application is put into a same folder, and the folder is arranged to a target position, corresponding to the icon of the video application, in the interface of the user terminal.

Optionally, an icon at another target position closest to the target position may be selected from the interface shown in FIG. 5 as the foregoing another target icon.

In the technical solutions provided in the embodiments of the present disclosure, a target interface is determined, and at least one first icon in the target interface and an arrangement position of each first icon in the target interface are determined; a target icon matching the first icon is determined from a plurality of second icons on a user terminal; a target position corresponding to the target icon, in an interface of the user terminal is determined based on an arrangement position corresponding to the first icon that matches the target icon; and the target icon is arranged in the interface of the user terminal based on the target position. In this way, automatic arrangement of icons in the interface of the user terminal may be achieved, thereby improving user experience.

The following further explains and describes an icon arrangement apparatus provided in the present disclosure with reference to the accompanying drawings by using specific embodiments, and the embodiments do not constitute a limitation on the embodiments of the present disclosure.

Figure 6:
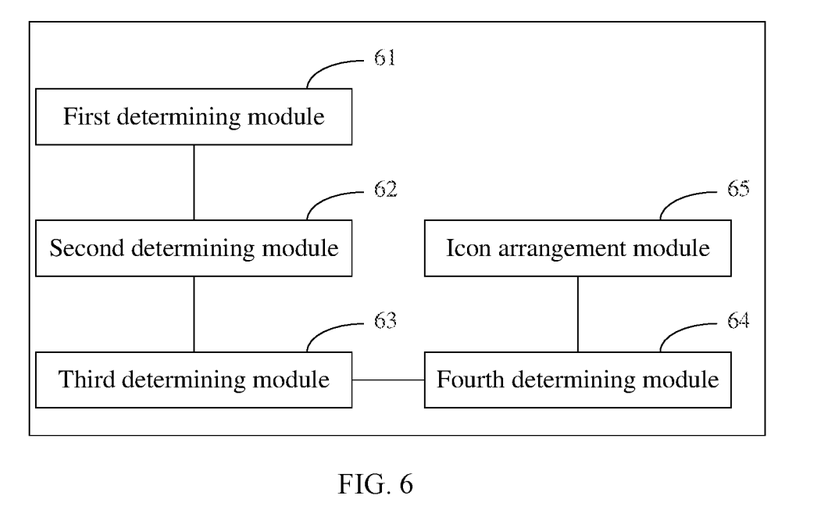
FIG. 6 is a block diagram of an icon arrangement apparatus according to an example embodiment of the present disclosure.

FIG. 6 is a block diagram of an icon arrangement apparatus according to an example embodiment of the present disclosure. As shown in FIG. 6, the apparatus includes a first determining module 61, a second determining module 62, a third determining module 63, a fourth determining module 64 and an icon arrangement module 65.

The first determining module 61 is configured to determine a target interface.

The second determining module 62 is configured to determine at least one first icon in the target interface and an arrangement position of each first icon in the target interface.

The third determining module 63 is configured to determine, from a plurality of second icons on the user terminal, a target icon matching the first icon.

The fourth determining module 64 is configured to determine a target position, corresponding to the target icon, in an interface of the user terminal based on the arrangement position corresponding to the first icon that matches the target icon.

The icon arrangement module 65 is configured to arrange the target icon in the interface of the user terminal based on the target position.

In a possible implementation, the first determining module 61 is specifically configured to:
determine a received interface as the target interface; or
determine the target interface from a local photo gallery.

In a possible implementation, the second determining module 62 is specifically configured to:
determine an icon layout position of each first icon in the target interface or coordinate information of a center of each first icon in the target interface; and
determine the icon layout position or the coordinate information as the arrangement position of the first icon in the target interface.

In a possible implementation, the third determining module 63 is specifically configured to:
for each first icon, determine a degree of similarity between the first icon and each of the plurality of second icons on the user terminal; and
determine a second icon with a highest degree of similarity as the target icon matching the first icon.

In a possible implementation, the icon arrangement module 65 is specifically configured to:
for each target icon, determine whether the target position corresponding to the target icon overflows the interface of the user terminal; and
if the target position corresponding to the target icon does not overflow the interface of the user terminal, arrange the target icon at the target position in the interface of the user terminal.

In a possible implementation, the icon arrangement module 65 is further configured to:
if the target position corresponding to the target icon overflows the interface of the user terminal, determine whether an idle position is available in the interface of the user terminal;
if an idle position is available in the interface of the user terminal, arrange the target icon at the idle position in the interface of the user terminal;
if no idle position is available in the interface of the user terminal, put the target icon and another target icon already arranged in the interface of the user terminal into a same folder, and arrange the folder at a target position, corresponding to the another target icon, in the interface of the user terminal.

In a possible implementation, the icon arrangement module 65 is specifically configured to:
if a plurality of idle positions are available in the interface of the user terminal, select, from the plurality of idle positions, an idle position closest to the target position corresponding to the target icon; and
arrange the target icon at the selected idle position in the interface of the user terminal.

Figure 7:
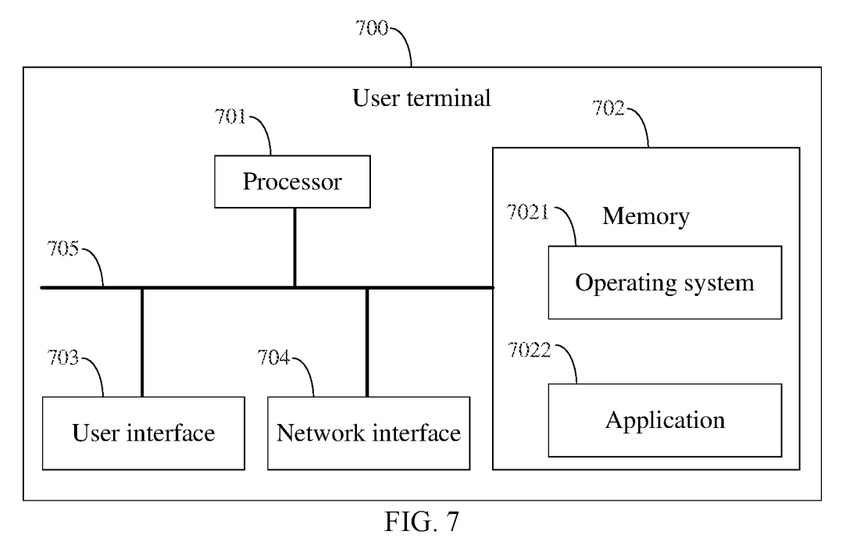
FIG. 7 is a schematic structural diagram of a user terminal according to an embodiment of the present disclosure.

FIG. 7 is a schematic structural diagram of a user terminal according to an embodiment of the present disclosure. The user terminal 700 shown in FIG. 7 includes: at least one processor 701, a memory 702, at least one network interface 704, and another user interface 703. Various components of the user terminal 700 are coupled by using a bus system 705. It can be understood that the bus system 705 is configured to implement connection and communication between these components. In addition to including a data bus, the bus system 705 further includes a power bus, a control bus, and a status signal bus. However, for clarity of description, various buses are marked as the bus system 705 in FIG. 7.

The user interface 703 may include a display, a keyboard, or a pointing device (such as a mouse, a trackball, a touch pad, or a touchscreen).

It can be understood that the memory 702 in this embodiment of the present disclosure may be a volatile memory or a nonvolatile memory, or may include both a volatile memory and a nonvolatile memory. The nonvolatile memory may be a Read-Only Memory (ROM), a Programmable Read-Only Memory (Programmable ROM, PROM), an Erasable Programmable Read-Only Memory (Erasable PROM, EPROM), an Electrically Erasable Programmable Read-Only Memory (Electrically EPROM, EEPROM), or a flash memory. The volatile memory may be a Random Access Memory (RAM), and is used as an external cache. By way of example but not limitative description, many forms of RAMs may be used, for example, a Static Random Access Memory (Static RAM, SRAM), a Dynamic Random Access Memory (Dynamic RAM, DRAM), a Synchronous Dynamic Random Access Memory (Synchronous DRAM, SDRAM), a Double Data Rate Synchronous Dynamic Random Access Memory (Double Data Rate SDRAM, DDRSDRAM), an Enhanced Synchronous Dynamic Random Access Memory (Enhanced SDRAM, ESDRAM), a Synchlink Dynamic Random Access Memory (Synchlink DRAM, SLDRAM), and a Direct Rambus Random Access Memory (Direct Rambus RAM, DRRAM). The memory 702 described in this specification includes but is not limited to these and any memory of another proper type.

In some implementations, the memory 702 stores the following elements: an executable unit or a data structure, or subsets thereof, or extension sets thereof: an operating system 7021 and an application 7022.

The operating system 7021 includes various system programs such as a framework layer, a kernel library layer, a driver layer, and the like, and is configured to implement various basic services and process hardware-based tasks. The application 7022 includes various applications such as a Media Player and a Browser, and is configured to implement various application services. A program for implementing the method in this embodiment of the present disclosure may be included in the application 7022.

In this embodiment of the present disclosure, by invoking a program or instructions stored in the memory 702, which may be specifically a program or instructions stored in the application 7022, the processor 701 is configured to perform the steps of the method provided in each method embodiment, for example, including:
determining a target interface;
determining at least one first icon in the target interface and an arrangement position of each first icon in the target interface;
determining, from a plurality of second icons on the user terminal, a target icon matching the first icon;
determining a target position, corresponding to the target icon, in an interface of the user terminal based on the arrangement position corresponding to the first icon that matches the target icon; and
arranging the target icon in the interface of the user terminal based on the target position.

The method disclosed in the foregoing embodiments of the present disclosure may be applied to the processor 701, or implemented by the processor 701. The processor 701 may be an integrated circuit chip having a signal processing capability. During an implementation process, the steps of the foregoing method may be completed by using a hardware integrated logic circuit in the processor 701 or instructions in a form of software in the processor. The foregoing processor 701 may be a general purpose processor, a Digital Signal Processor (DSP), an Application-Specific Integrated Circuit (ASIC), a Field Programmable Gate Array (FPGA) or another programmable logic device, a discrete gate or a transistor logic device, or a discrete hardware component. The methods, the steps, and logical block diagrams that are disclosed in the embodiments of the present disclosure may be implemented or performed. The general purpose processor may be a microprocessor or the processor may be any conventional processor or the like. Steps of the methods disclosed with reference to the embodiments of the present disclosure may be directly executed and accomplished by a hardware decoding processor, or may be executed and accomplished by using a combination of hardware and software units in a decoding processor. The software unit may be located in a mature storage medium in the art, such as a random access memory, a flash memory, a read-only memory, a programmable read-only memory, an electrically erasable programmable memory, a register, or the like. The storage medium is located in the memory 702. The processor 701 reads information from the memory 702, and completes the steps of the foregoing methods in combination with hardware of the processor 701.

It may be understood that the embodiments described in this specification may be implemented by hardware, software, firmware, middleware, microcode, or a combination thereof. For hardware implementation, a processing unit can be implemented in one or more Application-Specific Integrated Circuits (ASICs), a Digital Signal Processor (DSP), a Digital Signal Processing Device (DSP Device, DSPD), a Programmable Logic Device (PLD), a Field-Programmable Gate Array (FPGA), a general-purpose processor, a controller, a microcontroller, a microprocessor, other electronic units configured to perform the functions described in the present disclosure, or a combination thereof.

For software implementation, technologies described in this specification may be implemented through units that implement the functions described in this specification. Software code may be stored in a memory and executed by a processor. The memory may be implemented in the processor or outside the processor.

The user terminal provided in this embodiment may be the user terminal shown in FIG. 7, and may perform all steps of the icon arrangement method shown in FIG. 2, so as to achieve technical effects of the icon arrangement method shown in FIG. 2. For details, refer to related description of FIG. 2. For brevity, details are not described herein again.

An embodiment of the present disclosure further provides a storage medium (computer-readable storage medium) The storage medium herein stores one or more programs. The storage medium may include a volatile memory, such as a random-access memory. The storage medium may also include a nonvolatile memory, such as a read-only memory, a flash memory, a hard disk drive, or a solid-state drive. The storage medium may further include a combination of the foregoing types of memories.

When the one or more programs in the storage medium are executed by one or more processors, an icon arrangement method performed on a user terminal side is implemented.

The processor is configured to execute an icon arrangement program stored in the storage medium, so as to implement steps of the icon arrangement method performed on the user terminal side:

determining a target interface;

determining at least one first icon in the target interface and an arrangement position of each first icon in the target interface;

determining, from a plurality of second icons on the user terminal, a target icon matching the first icon;

determining a target position, corresponding to the target icon, in an interface of the user terminal based on the arrangement position corresponding to the first icon that matches the target icon, and arranging the target icon in the interface of the user terminal based on the target position.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a Random Access Memory (RAM), a memory, a Read-Only Memory (ROM), an Electrically Programmable ROM, an Electrically Erasable Programmable ROM, a register, a hard disk, a removable disk, a CD-ROM, or any other form of storage medium known in the art.

The objectives, technical solutions, and beneficial effects of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, improvement, or the like made within the spirit and principle of the present disclosure shall fall within the protection scope of the present disclosure.

What is claimed is:

1. An icon arrangement method, applied to a second user terminal, wherein the method comprises:

determining a target interface, wherein the target interface is an image of an interface of a first user terminal with at least one first icon whose arrangement position has been already determined;

determining the at least one first icon in the target interface and determining an arrangement position of each first icon in the target interface;

determining, from a plurality of second icons on the second user terminal, a target icon matching the first icon, wherein a matching between the target icon and the first icon means that the target icon and the first icon are icons of a same application;

determining a target position, corresponding to the target icon, in an interface of the second user terminal based on the arrangement position corresponding to the first icon that matches the target icon, wherein the target position is an arrangement position of the target icon which is the same as the arrangement position of the first icon; and arranging the target icon in the interface of the second user terminal based on the target position,
wherein the arranging the target icon in the interface of the second user terminal based on the target position comprises:
for each target icon, determining whether the target position corresponding to the target icon overflows the interface of the second user terminal, wherein the target position corresponding to the target icon overflows the interface of the second user terminal means that there is no target position corresponding to the target icon in the interface of the second user terminal;
when the target position corresponding to the target icon overflows the interface of the second user terminal, determining whether an idle position is available in the interface of the second user terminal;
when an idle position is available in the interface of the second user terminal, arranging the target icon at the idle position in the interface of the second user terminal;
when no idle position is available in the interface of the second user terminal, putting the target icon and another target icon already arranged in the interface of the second user terminal into a same folder, and arranging the folder at a target position, corresponding to the another target icon, in the interface of the second user terminal.

2. The method according to claim 1, wherein the determining a target interface comprises:
determining a received interface as the target interface; or
determining the target interface from a local photo gallery.

3. The method according to claim 1, wherein the determining an arrangement position of each first icon in the target interface comprises:
determining an icon layout position of each first icon in the target interface or coordinate information of a center of each first icon in the target interface; and
determining the icon layout position or the coordinate information as the arrangement position of the first icon in the target interface.

4. The method according to claim 1, wherein the determining, from a plurality of second icons on the second user terminal, a target icon matching the first icon comprises:
for each first icon, determining a degree of similarity between the first icon and each of the plurality of second icons on the second user terminal; and
determining a second icon with a highest degree of similarity as the target icon matching the first icon.

5. The method according to claim 1, wherein the arranging the target icon in the interface of the second user terminal based on the target position further comprises:
when the target position corresponding to the target icon does not overflow the interface of the second user terminal, arranging the target icon at the target position in the interface of the second user terminal.

6. The method according to claim 1, wherein the arranging the target icon at the idle position in the interface of the second user terminal comprises:
when a plurality of idle positions are available in the interface of the second user terminal, selecting, from the plurality of idle positions, an idle position closest to the target position corresponding to the target icon; and
arranging the target icon at the selected idle position in the interface of the second user terminal.

7. A user terminal, comprising a processor and a memory, wherein the processor is configured to execute an icon arrangement program stored in the memory, to implement an icon arrangement method, comprising:
determining a target interface, wherein the target interface is an image of an interface of a first user terminal with at least one first icon whose arrangement position has been already determined;
determining the at least one first icon in the target interface and determining an arrangement position of each first icon in the target interface;
determining, from a plurality of second icons on a second user terminal, a target icon matching the first icon, wherein a matching between the target icon and the first icon means that the target icon and the first icon are icons of a same application;
determining a target position, corresponding to the target icon, in an interface of the second user terminal based on the arrangement position corresponding to the first icon that matches the target icon, wherein the target position is an arrangement position of the target icon which is the same as the arrangement position of the first icon; and
arranging the target icon in the interface of the second user terminal based on the target position,
wherein the arranging the target icon in the interface of the second user terminal based on the target position comprises:
for each target icon, determining whether the target position corresponding to the target icon overflows the interface of the second user terminal, wherein the target position corresponding to the target icon overflows the interface of the second user terminal means that there is no target position corresponding to the target icon in the interface of the second user terminal; and
when the target position corresponding to the target icon overflows the interface of the second user terminal, determining whether an idle position is available in the interface of the second user terminal;
when an idle position is available in the interface of the second user terminal, arranging the target icon at the idle position in the interface of the second user terminal;
when no idle position is available in the interface of the second user terminal, putting the target icon and another target icon already arranged in the interface of the second user terminal into a same folder, and arranging the folder at a target position, corresponding to the another target icon, in the interface of the second user terminal.

8. The user terminal according to claim 7, wherein the determining a target interface comprises:
determining a received interface as the target interface; or
determining the target interface from a local photo gallery.

9. The user terminal according to claim 7, wherein the determining an arrangement position of each first icon in the target interface comprises:
determining an icon layout position of each first icon in the target interface or coordinate information of a center of each first icon in the target interface; and
determining the icon layout position or the coordinate information as the arrangement position of the first icon in the target interface.

10. The user terminal according to claim 7, wherein the determining, from a plurality of second icons on the second user terminal, a target icon matching the first icon comprises:

for each first icon, determining a degree of similarity between the first icon and each of the plurality of second icons on the second user terminal; and determining a second icon with a highest degree of similarity as the target icon matching the first icon.

11. The user terminal according to claim 7, wherein the arranging the target icon in the interface of the second user terminal based on the target position further comprises:

when the target position corresponding to the target icon does not overflow the interface of the second user terminal, arranging the target icon at the target position in the interface of the second user terminal.

12. The user terminal according to claim 7, wherein the arranging the target icon at the idle position in the interface of the second user terminal comprises:

when a plurality of idle positions are available in the interface of the second user terminal, selecting, from the plurality of idle positions, an idle position closest to the target position corresponding to the target icon; and arranging the target icon at the selected idle position in the interface of the second user terminal.

13. A non-transitory storage medium, wherein the non-transitory storage medium stores one or more programs, and the one or more programs are executed by one or more processors, to implement the icon arrangement method according to claim 1.

* * * * *